United States Patent [19]

Draghetti

[11] Patent Number: 6,047,526
[45] Date of Patent: Apr. 11, 2000

[54] METHOD OF BALANCING THE OUTPUT OF TWO LINES OF A PACKING SYSTEM

[75] Inventor: Fiorenzo Draghetti, Medicina, Italy

[73] Assignee: G. D Societa' Per Azioni, Bologna, Italy

[21] Appl. No.: 09/067,136

[22] Filed: Apr. 27, 1998

[30] Foreign Application Priority Data

Apr. 28, 1997 [IT] Italy .................... BO97A0249

[51] Int. Cl.[7] .................................... B65B 35/30
[52] U.S. Cl. ........................ 53/443; 53/52; 53/202; 53/493; 53/498; 53/531; 198/444
[58] Field of Search .................... 53/52, 53, 54, 53/154, 168, 171, 202, 203, 237, 531, 443, 461, 493, 494, 498, 500, 501, 503, 504; 198/358, 363, 444

[56] References Cited

U.S. PATENT DOCUMENTS

| | | | |
|---|---|---|---|
| 3,216,173 | 11/1965 | Anderson | 53/154 X |
| 3,248,844 | 5/1966 | Cross et al. | 53/493 X |
| 3,429,416 | 2/1969 | Provost et al. . | |
| 3,528,213 | 9/1970 | Mottweiler | 53/203 X |
| 3,532,387 | 10/1970 | Stahcari | 53/493 X |
| 3,614,853 | 10/1971 | Seragholi | 53/493 X |
| 3,665,933 | 5/1972 | Molins et al. . | |
| 3,944,049 | 3/1976 | Graybill . | |
| 4,135,346 | 1/1979 | Rebsamen | 53/494 |
| 4,161,094 | 7/1979 | Blidung et al. | 53/202 X |
| 4,166,525 | 9/1979 | Bruno . | |
| 4,222,478 | 9/1980 | Gasser . | |
| 4,280,611 | 7/1981 | Molins et al. . | |
| 4,394,896 | 7/1983 | McComas et al. | 53/494 X |
| 4,507,908 | 4/1985 | Seragholi | 53/498 |
| 4,604,704 | 8/1986 | Eaves et al. | 53/493 X |
| 4,672,796 | 6/1987 | Ono et al. | 53/494 X |
| 4,790,422 | 12/1988 | Clarke et al. . | |
| 4,903,713 | 2/1990 | Clarke . | |
| 4,932,190 | 6/1990 | Bergher et al. | 53/57 X |
| 4,934,129 | 6/1990 | Hoffman et al. | 53/496 X |
| 5,074,096 | 12/1991 | Focke | 53/202 X |
| 5,109,650 | 5/1992 | Hogenkamp | 53/168 X |
| 5,170,877 | 12/1992 | Francioni . | |
| 5,577,594 | 11/1996 | Belvederi . | |

FOREIGN PATENT DOCUMENTS

| | | |
|---|---|---|
| 0383615 | 8/1990 | European Pat. Off. . |
| 0527542 | 2/1993 | European Pat. Off. . |
| 8518948 U | 8/1985 | Germany . |

*Primary Examiner*—Daniel B. Moon
*Attorney, Agent, or Firm*—Marshall, O'Toole, Gerstein, Murray & Borun

[57] ABSTRACT

A method of balancing the output of two lines of a packing system, wherein the two lines extend through at least two machines, at least one of which is a two-line machine, along two respective paths to produce and form respective articles into groups, and to pack the groups; the method including slowing down the articles, on each line, at at least one control station to form a continuous queue of contiguous articles; measuring the length of each queue; and maintaining the lengths of both queues and the difference between the lengths of the two queues within a first and a second given variation range respectively.

6 Claims, 1 Drawing Sheet

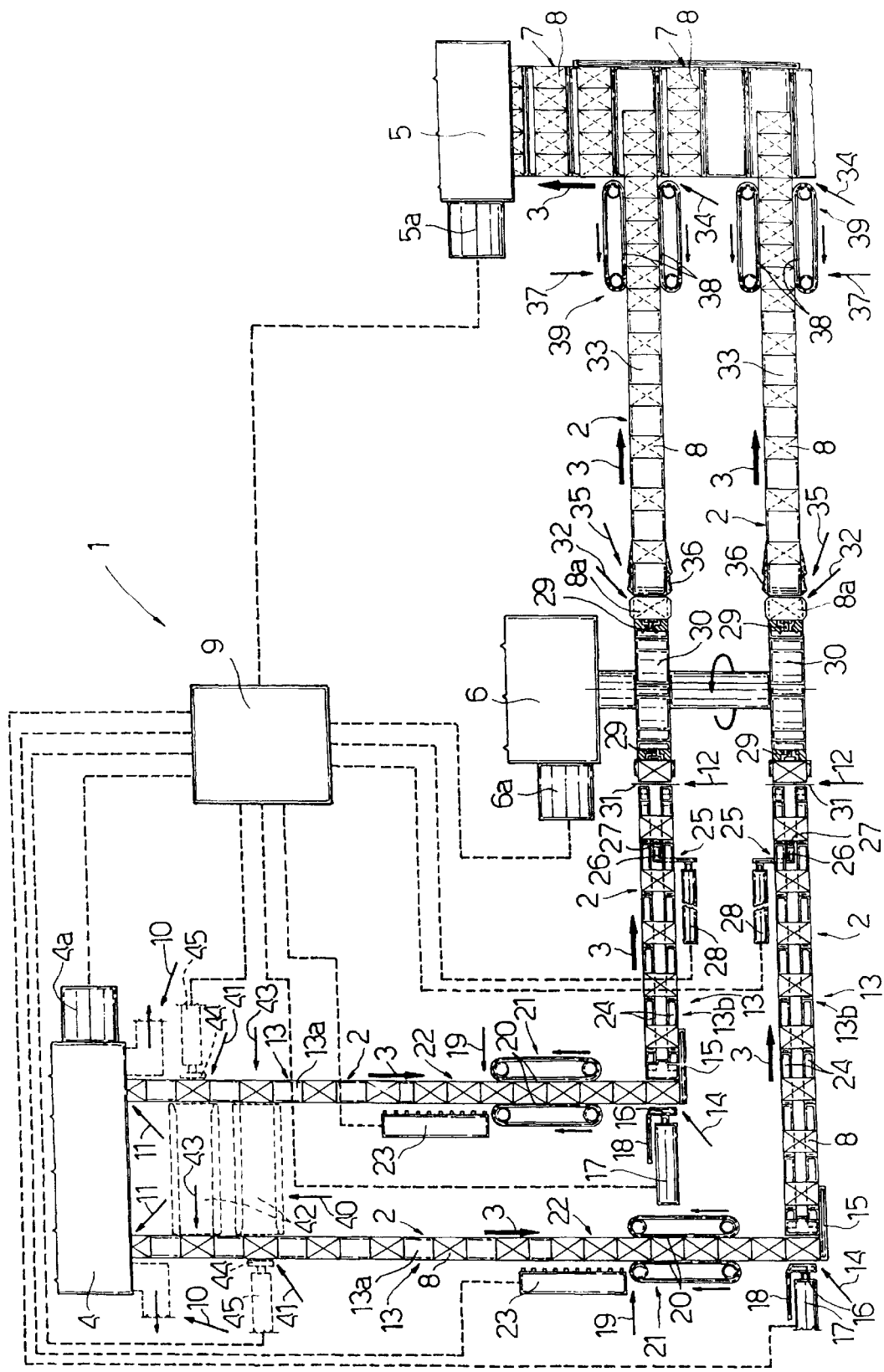

METHOD OF BALANCING THE OUTPUT OF TWO LINES OF A PACKING SYSTEM

BACKGROUND OF THE INVENTION

The present invention relates to a method of balancing the output of two lines of a packing system.

The present invention may be used to advantage in the tobacco industry, particularly for forming and wrapping cartons of cigarettes, to which the following description refers purely by way of example.

The tobacco industry is known to employ packing systems featuring two packing lines, and which comprise a two-line or dual cigarette packing machine, a cartoning machine, and a two-line or dual cellophaning machine interposed between the dual packing machine and the cartoning machine.

In normal operating conditions, the three machines of packing systems of the above type are driven synchronously so that each operates in time with the other two.

For any of various reasons, however, the operating speed of one of the machines may fall below the common speed at which the three machines are timed to operate. For example, if the packing machine slows down, even temporarily, with respect to the cellophaning and cartoning machines, each packing machine line produces one or more packets short of the number required to form a carton in at least one operating cycle of the system, i.e. in at least one cycle of operations performed simultaneously on the two lines by the three machines in the system to form and wrap two respective cartons of cigarettes, so that the cartoning machine produces at least two cartons with one or more packets missing.

Moreover, at least one reject station for rejecting faulty packets is normally provided along each of the two lines in the system.

Rejections obviously have the effect of unbalancing the lines. For example, in the event the packing machine produces a faulty packet on one line, the faulty packet is later rejected at the reject station, so that the number of packets supplied to the cellophaning machine on that particular line is one packet short, and, in the corresponding operating cycle, the cartoning machine produces two cartons, one of which with one packet short.

The above drawbacks could be eliminated by compensating the output of the two lines in the packing system by means of compensating stores interposed, along each of the two lines, between the packing and cellophaning machines, and between the cellophaning and cartoning machines. Such a solution, however, though valid, is fairly expensive.

SUMMARY OF THE INVENTION

It is an object of the present invention to provide a method of automatically balancing the output of two lines of a packing system, to eliminate the aforementioned drawbacks.

According to the present invention, there is provided a method of balancing the output of two lines of a packing system, wherein the two lines are operated in time with each other and extend through at least two machines, at least one of which is a two-line machine, along two respective given paths; the method being characterized by comprising the steps of feeding a succession of articles along said paths at a first given frequency, at a first given speed and in a given direction; slowing down the articles, on each line, at at least one control station to form a continuous queue of contiguous articles; measuring the length of each queue; and automatically maintaining the lengths of both queues and the difference between the lengths of the two queues within a first and a second given variation range respectively.

BRIEF DESCRIPTION OF THE DRAWING

The present invention will be described with reference to the accompanying drawing, which shows a schematic view, with parts removed for clarity, of a non-limiting embodiment.

DETAILED DESCRIPTION OF THE INVENTION

Number 1 in the accompanying drawing indicates as a whole a packing system comprising two packing lines 2, which are operated in time with each other, and extend, along respective substantially parallel packing paths 3, through a cigarette packing machine 4 with two wrapping lines, a cartoning machine 5, and a cellophaning machine 6 having two wrapping lines and interposed between packing machine 4 and cartoning machine 5.

Machines 4, 5, 6—which are known and therefore shown schematically in block form—are driven in known manner (not shown) by respective drive devices 4a, 5a, 6a, and cooperate with one another to produce, at each operating cycle of system 1, two cartons 7 of cigarettes, each comprising a predetermined number of cellophaned packets 8 of cigarettes.

Drive devices 4a, 5a, 6a are all connected to a single central control unit 9, which controls device 4a to operate machine 4 at a frequency equal to a first given frequency, and devices 5a and 6a to operate respective machines 5 and 6 at a frequency equal to a second given frequency.

Packing machine 4 comprises, for each line 2, a reject station 10 for rejecting any faulty packets 8; and an output station 11 connected to a corresponding input station 12 of cellophaning machine 6 by a conveying device 13 extending along respective path 3, and which is powered to feed an orderly succession of packets 8 of cigarettes along path 3 from packing machine 4 to cellophaning machine 6.

Each conveying device 13 comprises two conveyors 13a and 13b, which extend from respective stations 11 and 12, extend along respective portions—perpendicular to each other in the example shown—of respective path 3, and converge at a transfer station 14.

Each conveyor 13a is a belt conveyor driven in time with packing machine 4 to feed respective packets 8 to respective station 14 at a given speed and at a frequency equal to said first given frequency.

In each of the two stations 14, there are provided, crosswise to conveyor 13a, a plate 15 for arresting packets 8 on conveyor 13a; and a pusher 16, which, by means of a respective actuator 17 controlled by central control unit 9, is moved back and forth, at a frequency equal to the second given frequency, between a withdrawn rest position, in which pusher 16 is located on the opposite side of transfer station to conveyor 13b, and a work position, in which pusher 16 extends along plate 15 in the direction of conveyor 13b to transfer from conveyor 13a to conveyor 13b the packets 8 fed successively onto plate 15. Each pusher 16 carries an integral plate 18 substantially parallel to respective plate 15, and which provides for arresting packets 8 on the corresponding conveyor 13a when pusher 16 is in the work position.

Along each path 3, upstream from transfer station 14, there is provided a control station 19 where two moving endless belts 20 on either side of and crosswise to conveyor 13a define a movable gripping device 21. Belts 20 are moved (by drive devices not shown) in the traveling direction of, but at a slower speed than, conveyor 13a, adhere by friction to packets 8 fed towards station 19, and push packets 8 towards plate 15 to form, on plate 15, a continuous queue 22 of contiguous packets 8.

A measuring device 23 is provided at each control station 19, between machine 4 and respective gripping device 21, to measure the length of respective queue 22 and supply a corresponding signal to central control unit 9.

Each conveyor 13b is a pocket conveyor defined by two endless belts 24 fitted to two pulleys (not shown), one of which is powered to feed belts 24 in steps and at said second frequency towards cellophaning machine 6. Each conveyor 13b is connected to a transfer device defined by a pusher 25, an arm 26 of which is movable between the two belts 24 and carries an integral push plate 27 over and crosswise to belts 24. Pusher 25 is activated by a respective actuator 28 connected to central control unit 9, and is controlled by central control unit 9 to feed, in time with belts 24 and at a frequency equal to said second frequency, each packet 8 into a respective pocket of conveyor 13b, which feeds respective packets 8 to input station 12 of machine 6.

Each pocket of conveyor 13b cooperates at input station 12 with a respective counter-pusher 29 of cellophaning machine 6 to load each packet 8, together with a respective sheet 31 of overwrapping material, into a pocket of a wrapping wheel 30 of machine 6.

Once loaded into the respective pocket on wheel 30, each packet 8 is fed along a wrapping path, along which respective sheet 31 is folded in known manner about packet 8 to form a tubular wrapping 8a open at each end. At an output station 32 of the wrapping path, each packet 8 and respective wrapping 8a are transferred by respective counter-pusher 29 to the input of a further belt conveyor 33, which is operated in steps at said second frequency to transfer each packet 8 to the input station 34 of cartoning machine 5 via a folding station 35 where a known helical folding device 36 closes the opposite ends of each tubular wrapping 8a to complete the overwrapping of each packet 8.

Along each path 3, immediately upstream from input station 34 of cartoning machine 5, there is provided a grouping station 37 for grouping the cellophaned packets 8, and where two moving endless belts 38 on either side of and crosswise to conveyor 33 define a movable gripping device 39. Belts 38 are moved (by drive devices not shown) in the traveling direction of, but at a slower speed than, conveyor 33, adhere by friction to cellophaned packets 8 fed towards station 37, and push cellophaned packets 8 towards station 34 in groups, each comprising a number of cellophaned packets 8 equal to that required to form a carton 7.

In actual use, the packets 8 of cigarettes produced simultaneously by the two wrapping lines of packing machine 4 are fed simultaneously by respective conveyors 13a along respective paths 3 to respective control stations 19.

At each of the two control stations 19, packets 8 are slowed down by respective gripping device 21, and continue traveling, in contact with one another, towards respective stop plate 15 on which a queue 22 is formed.

Pusher 16 of each line 2 then loads packets 8 onto respective conveyor 13b, which feeds them to input station 12 of cellophaning machine 6, where they undergo a known overwrapping process as described above.

The cellophaned packets 8 from machine 6 are then fed by the two conveyors 33 to respective grouping stations 37, at each of which the cellophaned packets 8 are slowed down by respective gripping device 39, and continue traveling, in contact with one another, towards respective input station 34 of cartoning machine 5, to form a group of cellophaned packets 8 corresponding to to a carton 7 of cigarettes.

In normal operating conditions, machines 4, 5 and 6, pushers 16 and 25, and conveyors 13a, 13b and 33 all operate in time with one another at the same frequency, i.e. said first and second frequencies are equal, so that both queues 22 are maintained at predetermined constant lengths, which, in the absence of any rejects on machine 4, are also equal or generally differ by a relatively small constant amount.

If, for any reason, the output of machine 4 varies and machine 4 is operated at other than the common sync frequency, measuring device 23 of each line 2 detects a variation in the length of respective queue 22. If, as a result of said variation, the length of queue 22 is outside a given variation range, central control unit 9 causes machines 5 and 6, pushers 16 and 25, and conveyors 13b and 33 to also operate at other than the sync frequency to restore the length of queue 22 within the variation range, and further varies the frequency to keep queue 22 within the variation range. In other words, alongside a variation in the output of one of the machines of system 1 resulting in a similar variation in the lengths of both queues 22, central control unit 9 responds by acting on the motors of the other machines, on the motors (not shown) of the conveyors connecting the machines, and on the actuators of the transfer devices to vary the respective operating frequencies.

If, on the other hand, a condition of unbalance arises between the two lines 2, as a result of a different number of reject operations being performed at the two reject stations 10, the length of one queue 22 differs from that of the other. If the difference between the lengths of the two queues 22 is outside a respective given variation range, normally equal to the queue formed by packets 8 defining a carton 7, central control unit 9 disables, for an entire operating cycle of system 1, the actuator 17 of line 2 with the shorter queue 22.

Via delay means (not shown), the same central control unit 9 transmits a command to machines 5 and 6 to cut off the supply of wrapping material corresponding to the operating cycles in which the supply of packets 8 has been suspended.

In the variation shown by the dash lines in the accompanying drawing, any difference in the lengths of queues 22 is compensated by an automatic compensating station 40 common to both lines 2 and located between packing machine 4 and the two control stations 19.

Station 40 comprises, along each of first conveyors 13a, an unloading station 41 where conveyor 13a communicates with the input end of a guide 42 extending crosswise to conveyor 13a and for feeding packets 8 from unloading station 41 to a loading station 43 located along the opposite conveyor 13a and facing unloading station 41. A pusher 44 is provided at each unloading station 41, and is moved, by a respective actuator 45 controlled by central control unit 9, between a withdrawn rest position, in which pusher 44 is located on the opposite side of unloading station 41 to guide 42, and a work position, in which pusher 44 extends along guide 42 to feed a packet 8 to the corresponding loading station 43.

In actual use, if the difference between the lengths of the two queues is outside the respective given variation range, central control unit 9 operates actuator 45 of line 2 with the longer queue 22 to transfer a packet 8 to the loading station 43 of line 2 with the shorter queue 22, when central control unit 9 detects, by means of sensors (not shown), a missing packet 8 in station 43. The above transfer operation is repeated until the difference between the lengths of the two queues 22 is restored within the respective given variation range.

Finally, the balancing method described being of general application, cellophaning machine 6 and cartoning machine 5 may of course be interfaced in exactly the same way as machines 4 and 6, should machine 6 comprise a reject station (not shown) for each line 2.

I claim:

1. A method of balancing the output of a packing system having a first and second line, said lines being operated in time with each other and extending along first and second respective given paths and between a first machine operating at a first given frequency and a second machine operating at a second given frequency, the first machine being a two wrapping lines packing machine; wherein the method comprises the steps of:

feeding a first and second succession of articles along said respective first and second paths at said first given frequency, at a first given speed and in a given direction;

slowing down the articles of said first and second line in correspondence of a given first and second portion of said respective first and second path to form respective first and second continuous queue of contiguous articles, the first queue having a first variable length and the second queue having a second variable length;

measuring said first and second variable lengths;

varying at least one of said first and second given frequencies of said respective first and second machines for maintaining said first and second variable lengths within a first given variation range; and stopping said articles at a given point on one of said first and second lines for maintaining the difference between the first and the second variable lengths within a second given variation range.

2. A method as claimed in claim 1, wherein said slowing-down step is performed by first and second gripping means located along respective first and second paths; each said gripping means being movable, and being moved in said direction at a second given speed slower than said first speed.

3. A method as claimed in claim 1, wherein said first line comprises a first conveying device operated at said first frequency for receiving said articles from said first machine and a first conveyor operated at said second frequency for feeding said articles to said second machine, said second line comprises a second conveying device operated at said first frequency for receiving said articles from said first machine and a second conveyor operated at said second frequency for feeding said articles to said second machine; said first and second conveying devices and first and second conveyors being step-operated.

4. A method as claimed in claim 3, wherein said second machine is a cartoning machine for forming cartons containing respective groups of a given number of said articles arranged contiguously; said cartoning machine processing a group in an operating cycle; said step of stopping said articles at a given point on one said first and second lines lasting a period corresponding to the time taken to advance of a step at least a whole said group of articles at said second frequency.

5. A method as claimed in claim 3, wherein each said first and second conveying devices comprises two right angled portions, said articles being stopped at the end of one of said portions and being transferred by transfer means to the other portion with said first frequency.

6. A method as claimed in claim 5, wherein said step of stopping said articles at a given point on one of said first and second lines comprises the sub-step of arresting said transfer means.

* * * * *